(12) United States Patent
Jensen et al.

(10) Patent No.: US 8,416,895 B2
(45) Date of Patent: Apr. 9, 2013

(54) APPARATUS AND METHOD FOR IQ IMBALANCE CALIBRATION IN A RECEIVER

(75) Inventors: Henrik Jensen, Long Beach, CA (US); Hooman Darabi, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 775 days.

(21) Appl. No.: 12/535,484

(22) Filed: Aug. 4, 2009

(65) Prior Publication Data

US 2010/0329392 A1 Dec. 30, 2010

Related U.S. Application Data

(60) Provisional application No. 61/213,605, filed on Jun. 24, 2009.

(51) Int. Cl.
*H03D 1/04* (2006.01)
*H04L 27/06* (2006.01)

(52) U.S. Cl.
USPC .......................................... 375/346; 375/340

(58) Field of Classification Search .................. 375/316, 375/345, 346, 340, 350, 295, 296; 455/130, 455/455/296, 302, 303, 305, 307, 311, 326, 455/269, 280, 283, 284, 285
See application file for complete search history.

(56) References Cited

U.S. PATENT DOCUMENTS

| | | | | |
|---|---|---|---|---|
| 5,930,286 A | * | 7/1999 | Walley | 375/140 |
| 6,330,290 B1 | * | 12/2001 | Glas | 375/324 |
| 6,895,045 B2 | * | 5/2005 | Ozluturk et al. | 375/235 |
| 7,076,008 B2 | * | 7/2006 | Jeong | 375/345 |
| 2002/0057752 A1 | * | 5/2002 | Denno | 375/346 |
| 2006/0182189 A1 | * | 8/2006 | Yu et al. | 375/260 |
| 2007/0165748 A1 | * | 7/2007 | Khlat et al. | 375/322 |

* cited by examiner

*Primary Examiner* — David C. Payne
*Assistant Examiner* — Vineeta Panwalkar
(74) *Attorney, Agent, or Firm* — Sterne, Kessler, Goldstein & Fox P.L.L.C

(57) ABSTRACT

A method and apparatus is disclosed to compensate for an in-phase/quadrature phase (I/Q) imbalance in a communications receiver. The communications receiver may utilize information gained from observing one or more observational interferers to adjust one or more sequence parameters, such as gain and/or phase to provide some examples. The one or more observational interferers including one or more images outside of a desired frequency band of interest. The communications receiver provides one or more sequence parameter values to allow for real-time adjustment of the sequence parameters to compensate for the I/Q imbalances.

22 Claims, 11 Drawing Sheets

APPARATUS AND METHOD FOR IQ IMBALANCE CALIBRATION IN A RECEIVER

CROSS-REFERENCE TO RELATED APPLICATIONS

The present application claims the benefit of U.S. Provisional Patent Appl. No. 61/213,605, filed Jun. 24, 2009, entitled "Apparatus and Method for IQ Imbalance Calibration in a Receiver," which is incorporated herein by reference in its entirety.

FIELD OF THE INVENTION

The present invention relates generally to a communication system and specifically to compensation of imbalances within the communication system.

BACKGROUND

A conventional communication system allows for communication through a communications channel, such as a microwave radio link, a satellite channel, a fiber optic cable, a hybrid fiber optic cable system, or a copper cable to provide some examples. The conventional communication system includes a conventional communications transmitter to transmit one or more information signals to a conventional communications receiver via the communication channel.

The conventional communications transmitter often modulates the information signals using a quadrature modulating scheme. Quadrature modulating entails modulating the information signals with two transmitter carrier waves that are substantially similar in frequency but exhibit a 90-degree phase offset from one another. The information signals are modulated with a first transmitter carrier wave in an in-phase transmitter processing branch to provide an in-phase (I) signal and a second transmitter carrier wave in a quadrature phase transmitter processing branch to provide a quadrature phase (Q) signal. The I signal and Q signal are then combined to provide a transmitted communications signal.

The conventional communications receiver receives a received communications signal as it passes through the communications channel to provide one or more recovered information signals. The conventional communications receiver often demodulates the received communications signal using a quadrature demodulating scheme. The received communications signal is separated into a recovered I signal and a recovered Q signal. The conventional communications receiver operates on the recovered I signal in a conventional in-phase receiver processing branch using a first receiver carrier wave and the recovered Q signal in a conventional quadrature phase receiver processing branch using a second receiver carrier wave. The first receiver carrier wave and the second receiver carrier wave are substantially similar in frequency but are offset in phase by approximately 90-degrees from one another. The conventional communications receiver then combines the recovered I signal and the recovered Q signal to provide a recovered sequence of data.

Ideally, a gain response and/or a phase response of the conventional transmitter processing branches and/or the conventional receiver processing branches are identical. In practice, however, the gain response and/or phase response of these processing branches may not be exactly equal causing an in-phase/quadrature phase (I/Q) imbalance. This I/Q imbalance may cause a gain offset and/or phase offset between the recovered I signal and the recovered Q signal which along with other I/Q imbalances of the conventional communications system may degrade an ability of the conventional communications receiver to recover the recovered sequence of data from the received communications signal.

Commonly, the conventional communications receiver may be calibrated at a manufacturing factory to compensate for these I/Q imbalances. Calibration of the conventional communication receiver at the manufacturing factory often involves an estimation of the I/Q imbalance in the communication system under controlled operating conditions. The conventional communication receiver, however, may operate in conditions that differ from the controlled operating conditions at the manufacturing factory. For example, the conventional communication receiver may operate at temperatures that differ from the temperature under the controlled operating conditions and/or at operational frequencies that differ from the operational frequencies under the controlled operating conditions. As a result, the calibration of the conventional communications receiver at the factory may not adequately compensate for the I/Q imbalance in conditions that differ from the controlled operating conditions at the manufacturing factory.

The I/Q imbalance is compensated for in the conventional communication receiver by programming specific calibration parameters resulting from the controlled operating conditions into each conventional communication receiver. Process variations in semiconductor fabrication may cause the specific calibration parameters to differ from one conventional communication receiver to another. As a result, each conventional communication receiver may require specific calibration parameters that are unique for that particular conventional communication receiver which, in turn, requires the manufacturing factory to calibrate each conventional communication receiver.

Thus, there is a need for an apparatus and/or a method to compensate for I/Q imbalances in a communication receiver that overcomes the shortcomings described above. Further aspects and advantages of the present invention will become apparent from the detailed description that follows.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

Figure 3A:
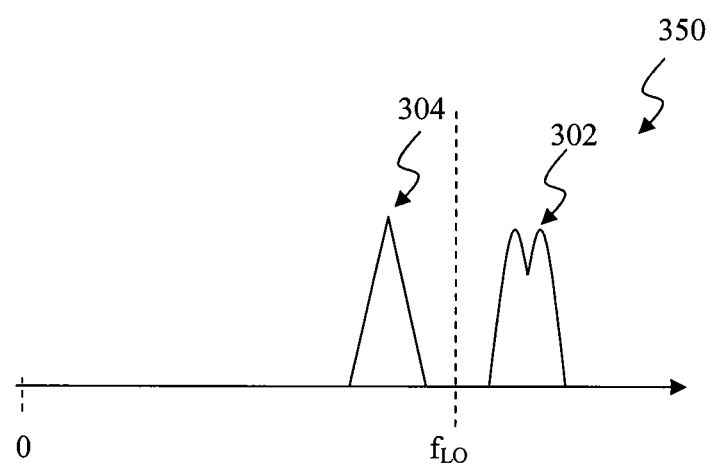

FIG. 3A graphically illustrates a frequency domain representation of a received communications signal as received by the communication receiver according to an exemplary embodiment of the present invention.

Figure 3B:
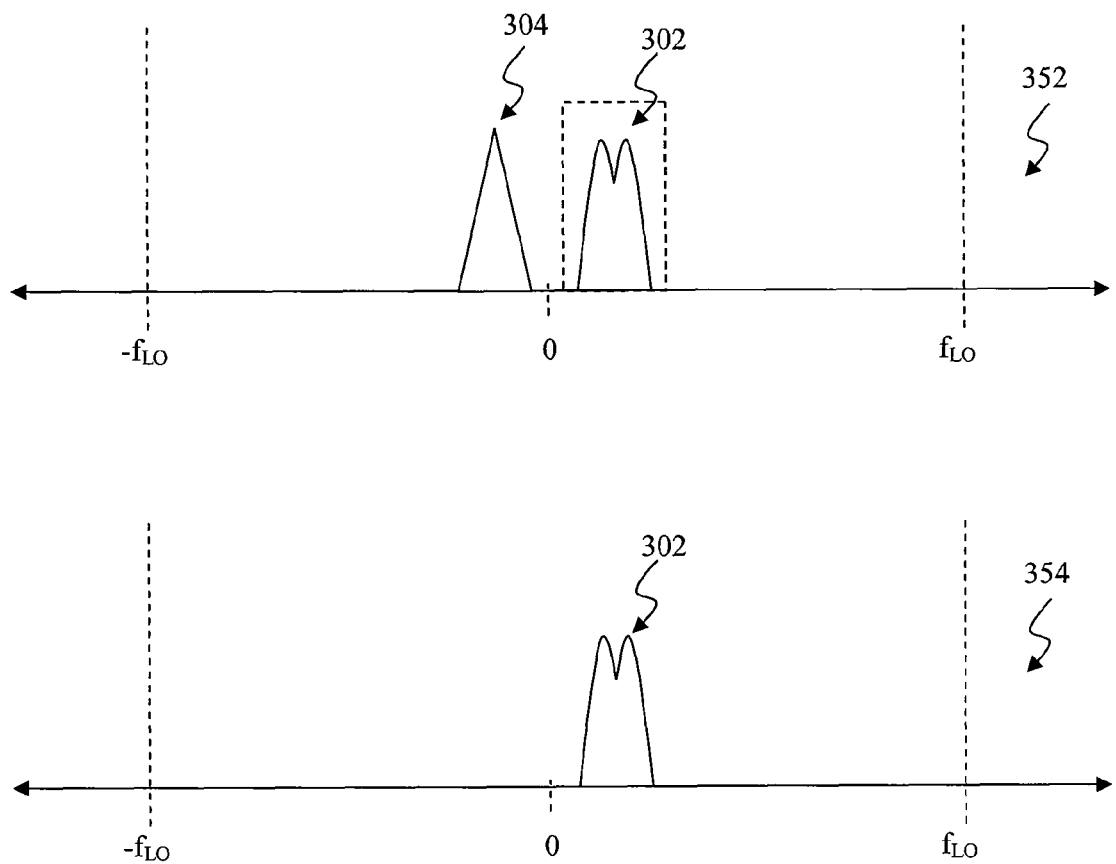

FIG. 3B graphically illustrates an operation of the communications receiver lacking substantial in-phase/quadrature phase (I/Q) imbalances according to an exemplary embodiment of the present invention.

Figure 3C:
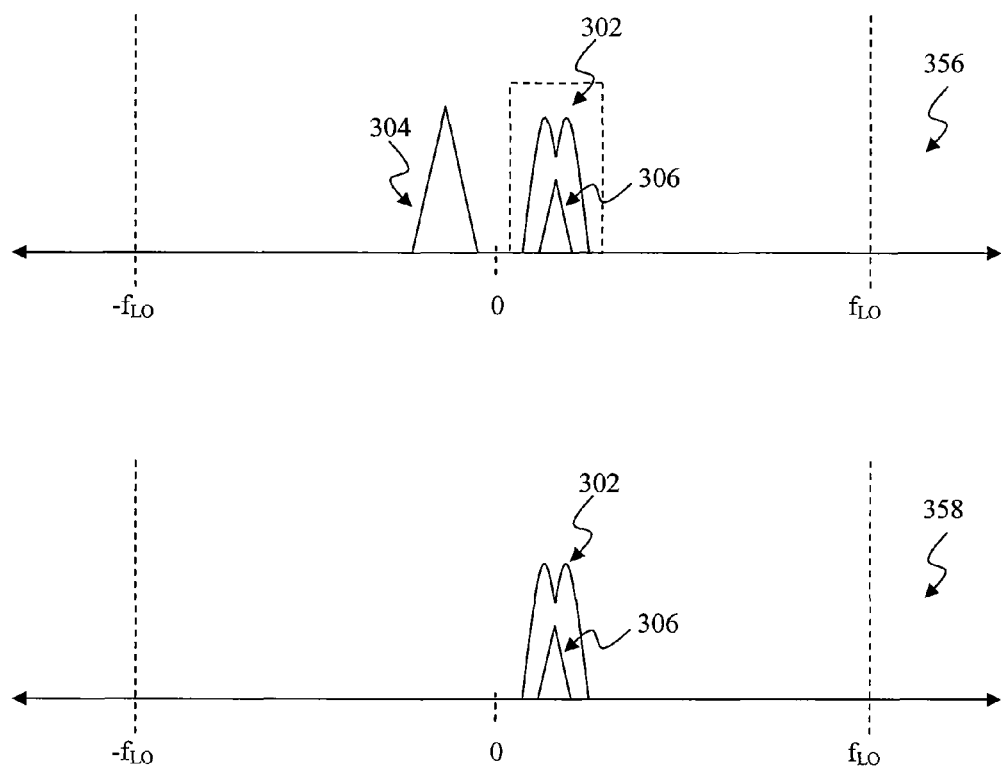

FIG. 3C graphically illustrates an operation of the communications receiver having substantial I/Q imbalances according to an exemplary embodiment of the present invention.

Figure 4A:
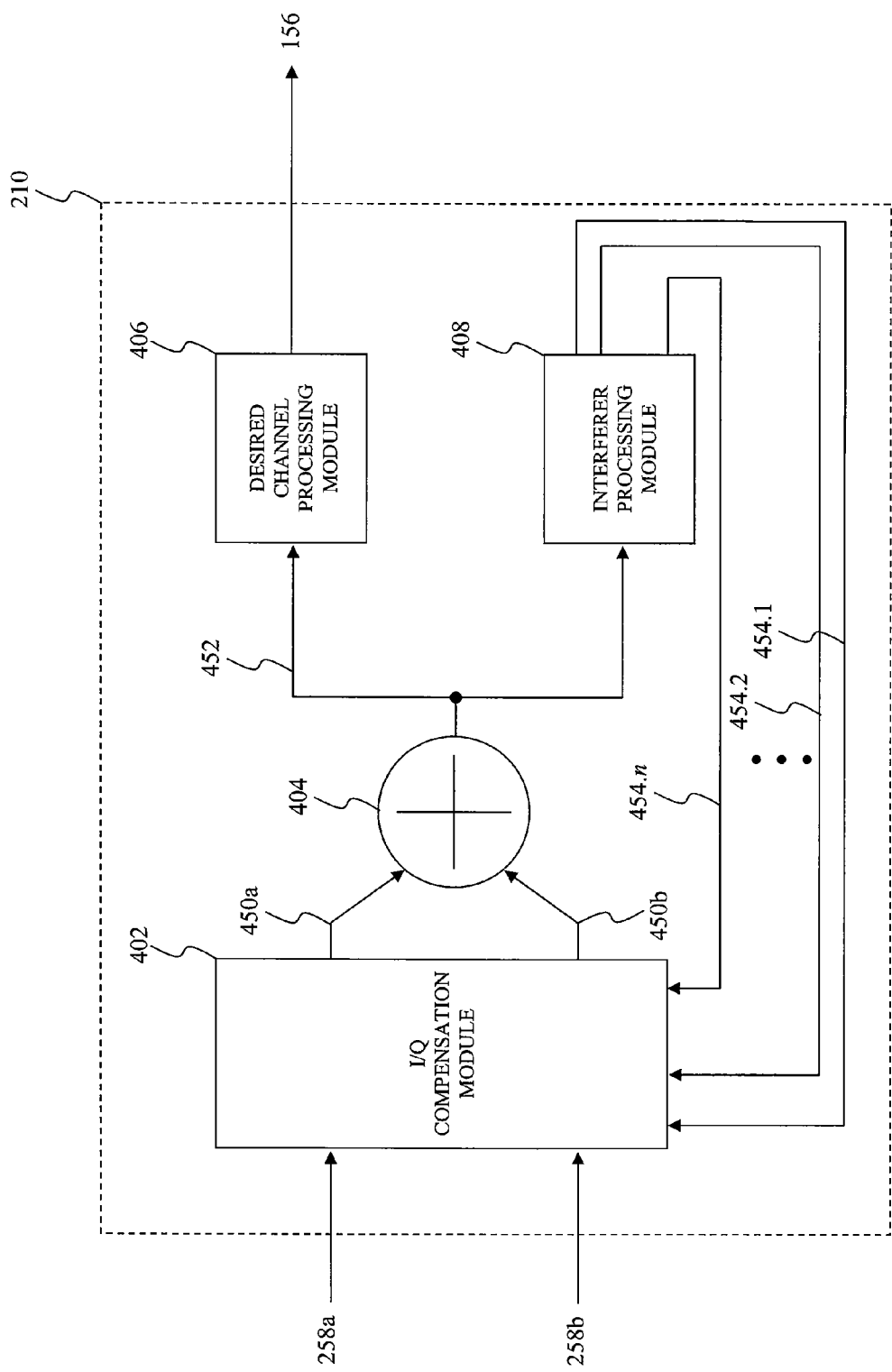

FIG. 4A illustrates a block diagram of a digital signal processor (DSP) used in the communications receiver according to an exemplary embodiment of the present invention.

Figure 4B:
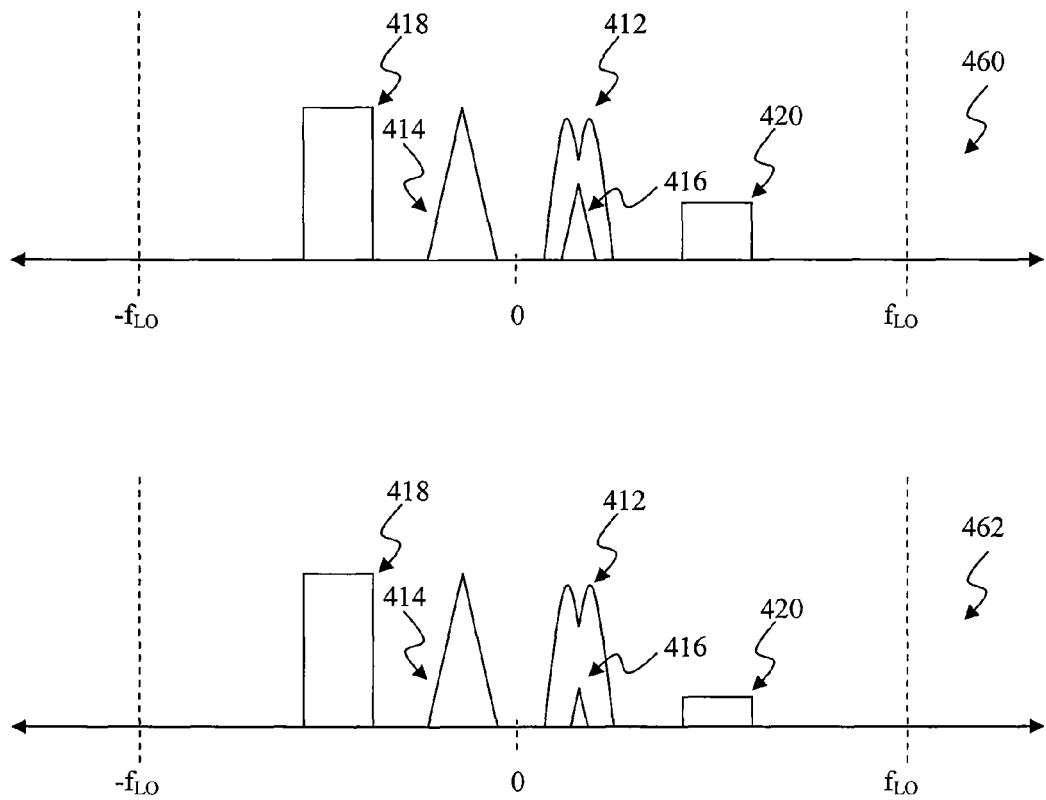

FIG. 4B graphically illustrates an operation of the DSP used in the communications receiver according to an exemplary embodiment of the present invention.

Figure 5:
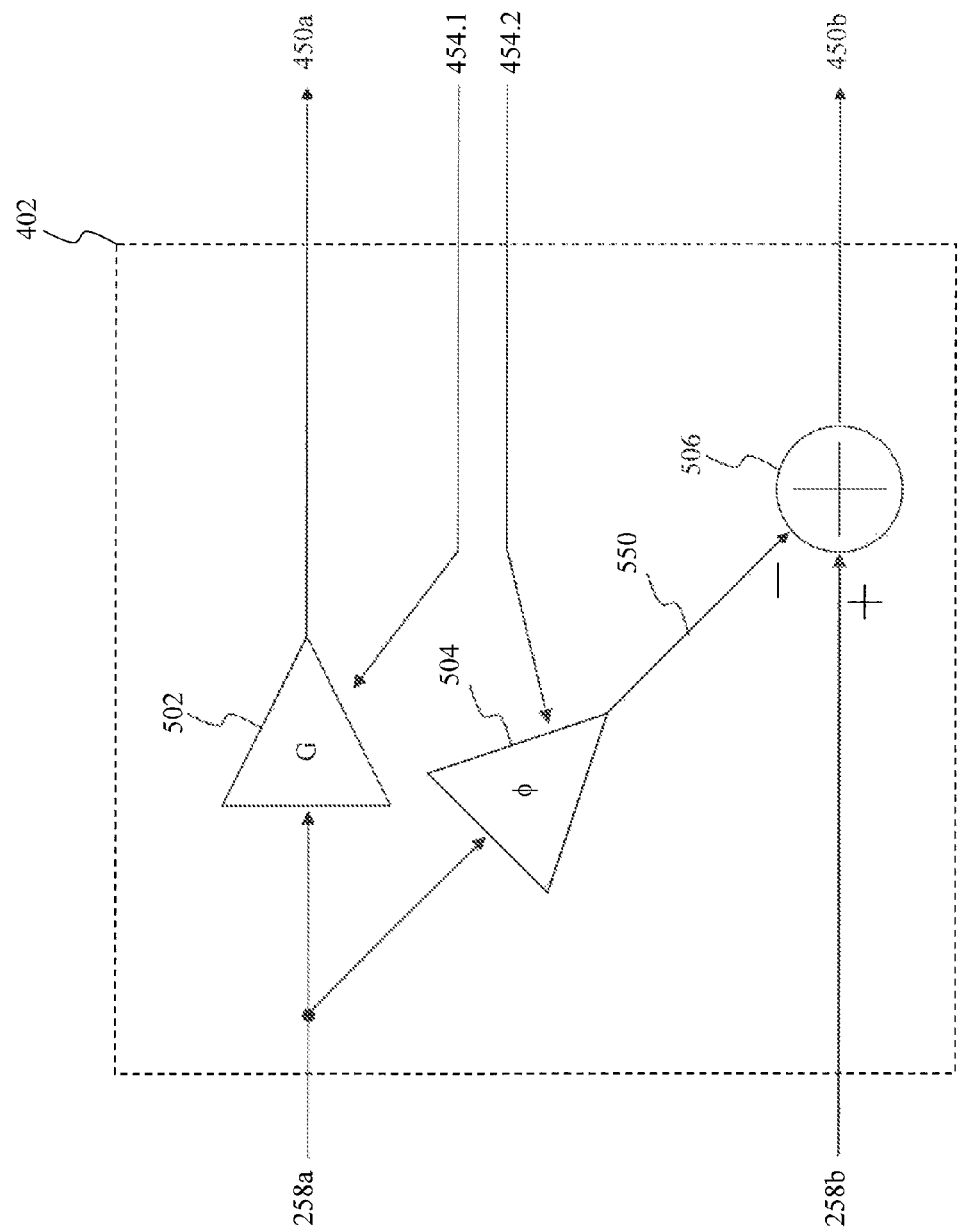

FIG. 5 illustrates a block diagram of an I/Q compensation module used in the DSP according to an exemplary embodiment of the present invention.

Figure 6:
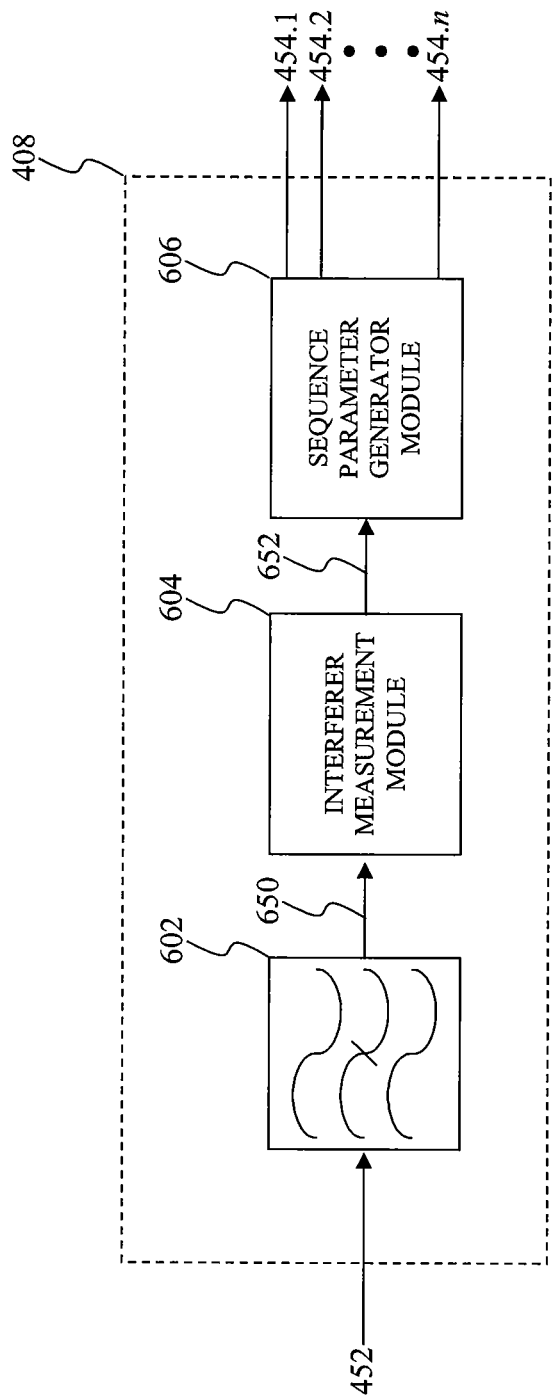

FIG. 6 illustrates a block diagram of an interferer processing module used in the DSP according to an exemplary embodiment of the present invention.

Figure 7:
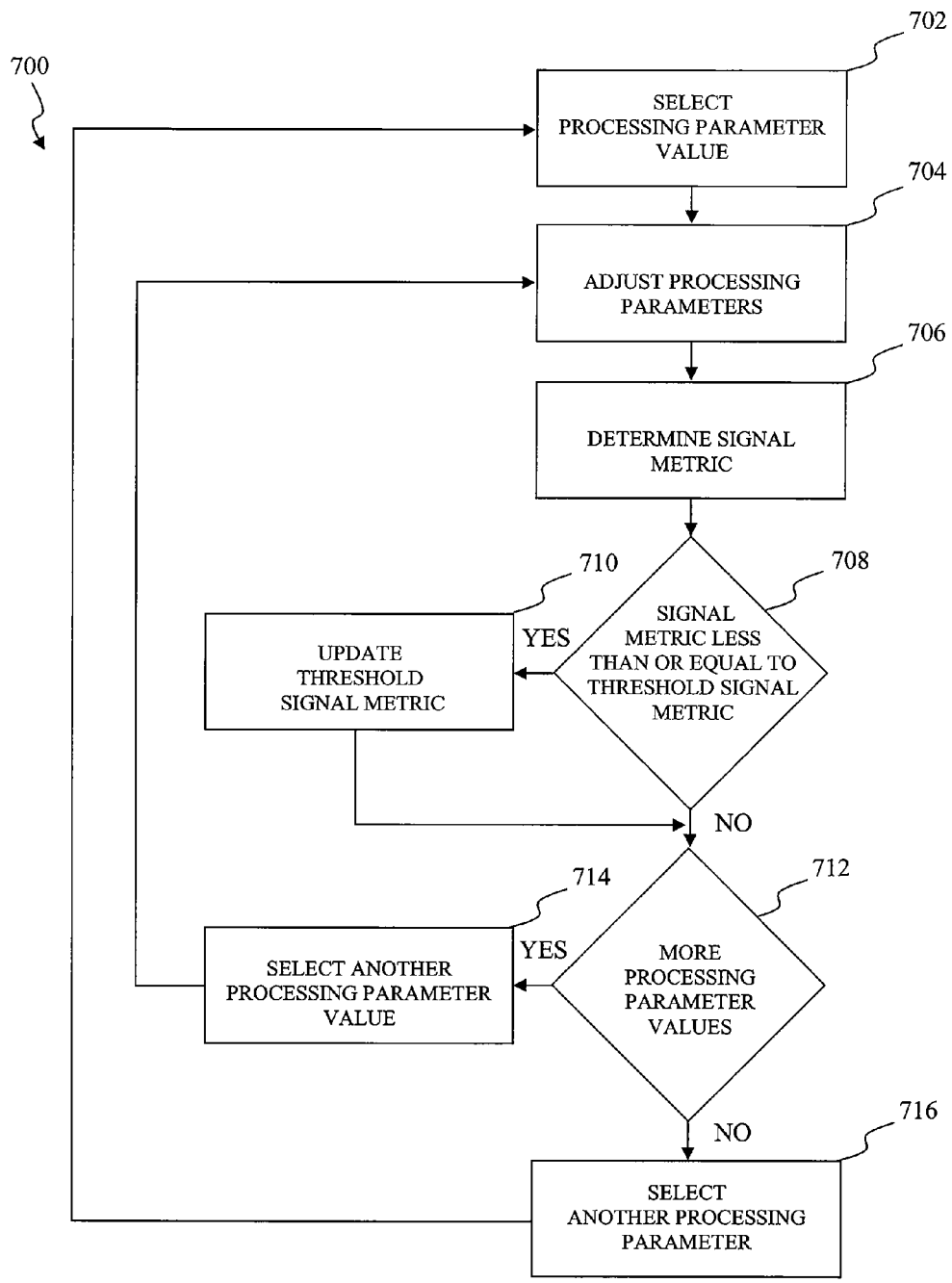

FIG. 7 is a flowchart of exemplary operational steps of the interferer processing module operating in a calibration mode of operation according to an aspect of the present invention.

Figure 8:
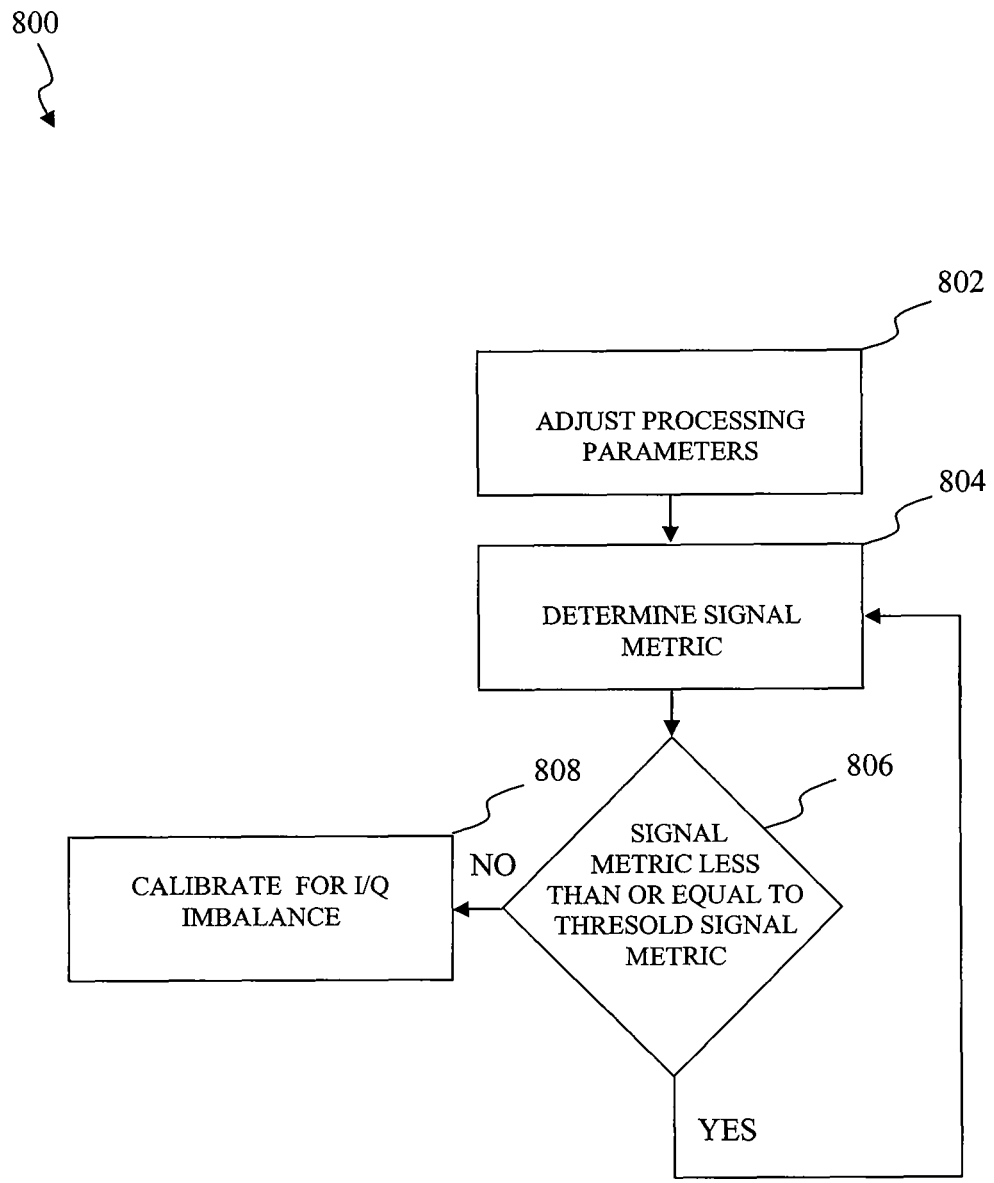

FIG. 8 is a flowchart of exemplary operational steps of the interferer processing module operating in an operational mode of operation according to an aspect of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communications Environment

Figure 1:
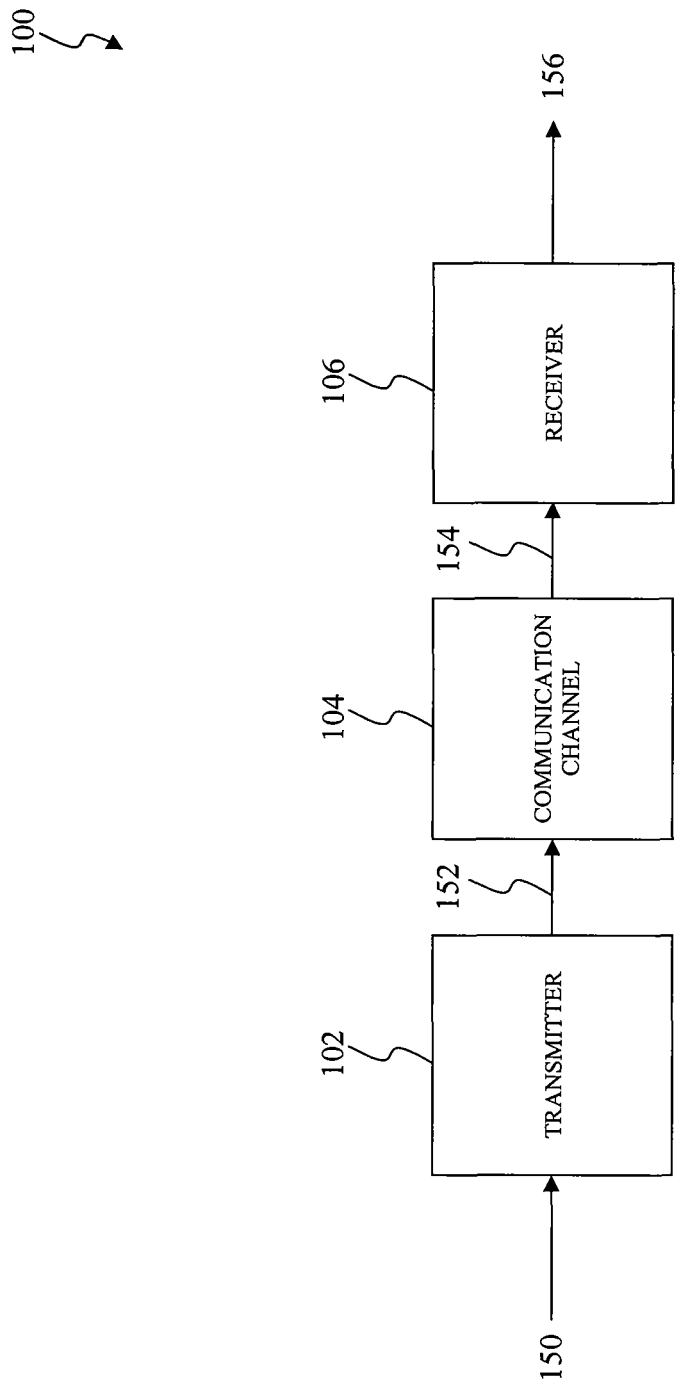
FIG. 1 illustrates a block diagram of a communications environment according to an exemplary embodiment of the present invention.

FIG. 1 illustrates a block diagram of a communications environment according to an exemplary embodiment of the present invention. The communications environment 100 includes a communications transmitter 102 to transmit one or more information signals, denoted as a sequence of data 150, as received from one or more transmitter user devices to a communications receiver 106 via a communications channel 104. The transmitter user devices may include, but are not limited to, personal computers, data terminal equipment, telephony devices, broadband media players, personal digital assistants, software applications, or any other device capable of transmitting or receiving data. The communications transmitter 102 provides a transmitted communications signal 152 based upon the sequence of data 150. More specifically, the communications transmitter 102 modulates the sequence of data 150 with a first transmitter carrier wave in an in-phase transmitter processing branch to provide an in-phase (I) signal and a second transmitter carrier wave in a quadrature phase transmitter processing branch to provide a quadrature phase (Q) signal. The first transmitter carrier wave and the second transmitter carrier wave are substantially similar in frequency but are offset in phase by approximately 90-degrees from one another. The communications transmitter 102 combines the I signal and the Q signal to provide the transmitted communications signal 152.

The transmitted communications signal 152 passes through the communications channel 104 to provide a received communications signal 154. The communications channel 104 may include, but is not limited to, a microwave radio link, a satellite channel, a fiber optic cable, a hybrid fiber optic cable system, or a copper cable to provide some examples.

The communications receiver 106 receives the received communications signal 154 as it passes through the communications channel 104 to provide one or more recovered information signals, denoted as a recovered sequence of data 156, for one or more receiver user devices. The receiver user devices may include, but are not limited to, personal computers, data terminal equipment, telephony devices, broadband media players, personal digital assistants, software applications, or any other device capable of transmitting or receiving data. More specifically, the communications receiver 106 separates the received communications signal 154 into a recovered I signal and a recovered Q signal. The communications receiver 106 operates on the recovered I signal in an in-phase receiver processing branch using a first receiver carrier wave and the recovered Q signal in a quadrature phase receiver processing branch using a second receiver carrier wave. The communications receiver 106 then combines the recovered I signal and the recovered Q signal to provide the recovered sequence of data 156. The first receiver carrier wave and the second receiver carrier wave are substantially similar in frequency but are offset in phase by approximately 90-degrees from one another.

Ideally, a gain response and/or a phase response of the transmitter processing branches and the receiver processing branches are identical. In practice, however, the gain response and/or phase response of these processing branches may not be exactly equal causing an in-phase/quadrature phase (I/Q) imbalance. This I/Q imbalance may cause a gain offset and/or phase offset between the recovered I signal and the recovered Q signal which along with other I/Q imbalances of the communications environment 100 may degrade an ability of the communications receiver 106 to recover the recovered sequence of data 156 from the received communications signal 154.

Communications Receiver

The communications receiver 106, however, may compensate for these I/Q imbalances. For example, the communications receiver 106 may adjust a gain and/or a phase of the in-phase receiver processing branch and/or the quadrature phase receiver processing branch to compensate for the I/Q imbalances, thereby increasing the ability of the communications receiver 106 to recover the recovered sequence of data 156 from the received communications signal 154.

Figure 2:
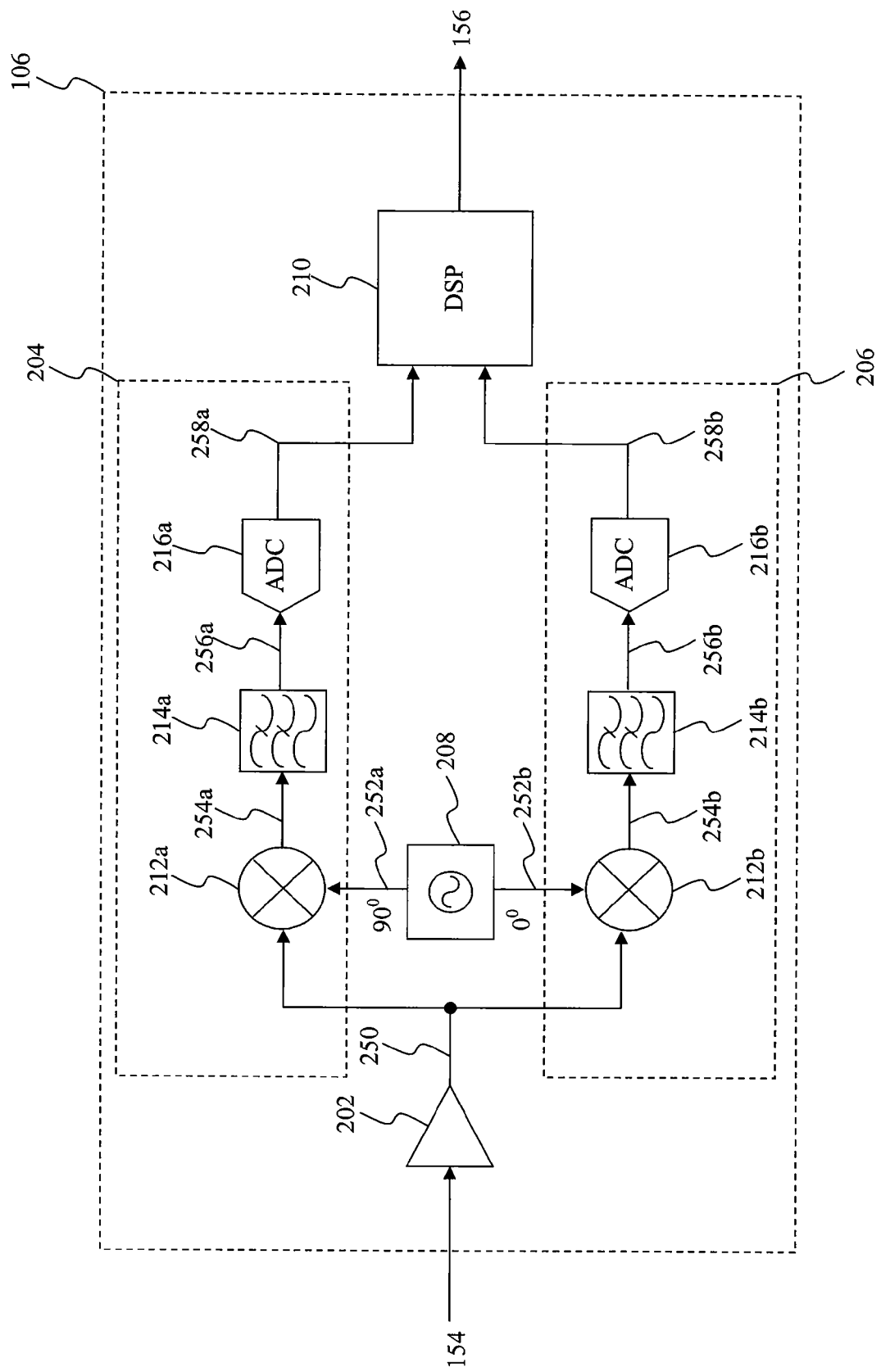
FIG. 2 illustrates a block diagram of a communications receiver used in the communications environment according to an exemplary embodiment of the present invention.

FIG. 2 illustrates a block diagram of a communications receiver used in the communications environment according to an exemplary embodiment of the present invention. The received communications signal 154 may include electromagnetic energy within a desired frequency band of interest, commonly referred to as a desired sequence of data, and electromagnetic energy outside of the desired frequency band of interest. The electromagnetic energy located outside of the desired frequency band of interest represents one or more interferers embedded within the received communications signal 154. The one or more interferers may include one or more observational interferers, the one or more observational interferers including one or more images outside of the desired frequency band of interest. The communications receiver 106 may utilize information gained from observing the one or more observational interferers and/or images of the one or more observational interferers to adjust one or more sequence parameter values corresponding to one or more sequence parameters, such as gain and/or phase to provide some examples, to compensate for the I/Q imbalances.

As shown in FIG. 2, the communications receiver includes a low noise amplifier (LNA) 202, an in-phase receiver processing branch 204, a quadrature receiver processing branch 206, a local oscillator 208, and a digital signal processor (DSP) 210. The LNA 202 amplifies the received communications signal 154 to provide an amplified received signal 250. The in-phase receiver processing branch 204 provides a recovered in-phase sequence of data 258a based upon the amplified received signal 250. Likewise, the quadrature phase receiver processing branch 206 provides a recovered quadrature phase sequence of data 258b based upon the amplified received signal 250. The in-phase receiver processing branch 204 and the quadrature phase receiver processing branch 206 operate in substantially similar manner. Therefore, only the in-phase receiver processing branch 204 will be discussed in further detail.

As additionally shown in FIG. 2, the in-phase receiver processing branch 204 includes a mixer 212a, a low pass filter 214a, and an analog to digital converter (ADC) 216a. The mixer 212a frequency translates or downconverts the amplified received signal 250 using a first receiver carrier wave 252a to provide a recovered in-phase signal 254a. The mixer 212a may downconvert the amplified received signal 250 directly to 0 Hertz, referred to as baseband or DC, or to an intermediate frequency (IF) that is greater than DC.

The downconversion of the amplified received signal 250 with the first receiver carrier wave 252a generates components or images of the amplified received signal 250 at integer intervals of the first receiver carrier wave 252a. In other words, the downconversion of the amplified received signal 250 generates images of the desired sequence of data and/or of the one or more observational interferers at the integer intervals. The low pass filter 214a filters the recovered in-phase signal 254a to reduce these components embedded within the recovered in-phase signal 254a to provide a recovered desired in-phase signal 256a. However, the low pass filter 214a may allow downconverted representations of the one or more observational interferers and/or the images of the one or more observational interferers embedded within the in-phase signal 254a to remain in the recovered desired in-phase signal 256a. As to be discussed below, information gained from observing the one or more observational interferers and/or the images of the one or more observational interferers is used to adjust the sequence parameter values corresponding to the sequence parameters to compensate for the I/Q imbalances.

The ADC 216a converts the recovered desired in-phase signal 256a from an analog represent to a digital representation to provide the recovered in-phase sequence of data 258a.

The LO 208 provides the first receiver carrier wave 252a and the second receiver carrier wave 252b (herein "receiver carrier waves 252") to the in-phase receiver processing branch 204 and the quadrature phase receiver processing branch 206, respectively. The receiver carrier waves 252 are substantially similar in frequency but are offset in phase by approximately 90-degrees from one another. The receiver carrier waves 252 may have a frequency that is substantially similar to a frequency of one or more components from among the desired frequency band of interest such that the components from among the desired frequency band of interest may be directly downconverted to DC. Alternatively, the receiver carrier waves 252 have a frequency that is less than or greater than the frequency of the components from among the desired frequency band of interest such that the components from among the desired frequency band of interest may be downconverted to the IF.

The DSP 210 combines the in-phase sequence of data 258a and the quadrature phase sequence of data 258b to provide the recovered sequence of data 156 after compensating for imbalances, the recovered sequence of data 156 representing the desired sequence of data embedded within the received communications signal 154. More specifically, the in-phase sequence of data 258a and the quadrature phase sequence of data 258b may represent imbalanced sequences as a result of the I/Q imbalances. The DSP 210 may determine the sequence parameter values corresponding to the sequence parameters by observing the one or more observational interferers and/or the images of the one or more observational interferers embedded with the in-phase sequence of data 258a and/or the quadrature phase sequence of data 258b (herein "sequence of data 258") to allow for real-time adjustment of the sequence parameter values to compensate for the I/Q imbalances.

FIG. 3A graphically illustrates a frequency domain representation of a received communications signal as received by the communication receiver according to an exemplary embodiment of the present invention. A received communications signal 350 includes electromagnetic energy within a desired frequency band of interest, commonly referred to as a desired sequence of data 302, and electromagnetic energy outside of the desired frequency band of interest. The electromagnetic energy located outside of the desired frequency band of interest represent one or more interferers 304 embedded within the received communications signal 350, the one or more interferers 304 including a corresponding image within the desired frequency band of interest. However, this example is not limiting, those skilled in the relevant art(s) will recognize that the received communications signal 350 may include other electromagnetic energy such as one or more images of the desired frequency band of interest 302, one or more images of the interferers 304, and/or any other electromagnetic energy that will be apparent to those skilled in the relevant art(s) without departing from the spirit and scope of the present invention. The received communications signal 350 may represent an exemplary embodiment of the received communications signal 154.

FIG. 3B graphically illustrates an operation of the communications receiver lacking substantial I/Q imbalances according to an exemplary embodiment of the present invention. An in-phase receiver processing branch, such as the in-phase receiver processing branch 204 to provide an example, may process the received communications signal 350 using a quadrature demodulating scheme to frequency and/or phase translate the desired frequency band of interest 302 and the interferers 304 to provide an in-phase sequence of data, such as the in-phase sequence of data 258a to provide an example. Likewise, a quadrature phase receiver processing branch, such as the quadrature phase receiver processing branch 206 to provide an example, may processes the received communications signal 350 using the quadrature demodulating scheme to frequency and/or phase translate the desired frequency band of interest 302 and the interferers 304 to provide a quadrature phase sequence of data, such as the quadrature phase sequence of data 258b to provide an example.

The in-phase sequence of data and the quadrature phase sequence of data may be represented as a complex sequence of data 352. As shown in FIG. 3B, the complex sequence of data 352 includes the frequency band of interest 302 and the interferers 304, each of which has been frequency translated or downconverted by a local oscillator of the receiver processing branches. The interferers 304 may be filtered or removed from the complex sequence of data 352, leaving only the frequency band of interest 302, to provide a recovered sequence of data 354. The recovered sequence of data 354 may represent an exemplary embodiment of the recovered sequence of data 156. For example, the receiver processing branches may include an analog low pass filter, such as the low pass filter 214 to provide an example, to filter the complex sequence of data 352. Likewise, a digital signal processor, such as the DSP 210 to provide an example, may include a digital filter, having a band pass or a low pass topology, to filter the complex sequence of data 352. The recovered sequence of data 354 may be filtered using the analog low pass filter or the digital filter alone, or in any combination thereof, to provide the recovered sequence of data 354. The recovered sequence of data 354 only includes desired frequency band of interest 302.

In this exemplary embodiment, the in-phase sequence of data and the quadrature phase sequence of data represented balanced sequences. More specifically, the in-phase sequence of data and the quadrature phase sequence of data are substantially aligned in-phase and/or in gain. However, when the interferers 304 embedded within the in-phase sequence of data and the interferers 304 embedded within the quadrature phase sequence of data represent imbalanced sequences, at least some components of the interferers 304 will remain in the recovered sequence of data 354, thereby degrading performance of the communications receiver. More specifically, the in-phase sequence of data and the quadrature phase sequence of data are not substantially aligned in-phase and/or in gain. In other words, the I/Q imbalances cause the interferers 304 embedded within the in-phase sequence of data not to be substantially aligned in-phase and/or in gain with the interferers 304 embedded within the quadrature phase sequence of data.

FIG. 3C graphically illustrates an operation of the communications receiver having substantial I/Q imbalances according to an exemplary embodiment of the present invention. The in-phase sequence of data and the quadrature phase sequence of data include the desired frequency band of interest 302 and the interferers 304 as described above.

In this exemplary embodiment, the in-phase sequence of data and the quadrature phase sequence of data are, however, imbalanced sequences. In other words, the in-phase sequence of data and the quadrature phase sequence of data are misaligned in phase and/or in gain. More specifically, the desired frequency band of interest 302 of the in-phase sequence of data and the desired frequency band of interest 302 of the quadrature phase sequence of data are misaligned in gain and/or phase. Likewise, the interferers 304 of the in-phase sequence of data and the interferers 304 of the quadrature phase sequence of data are misaligned in gain and/or phase.

The in-phase sequence of data and the quadrature phase sequence of data may be represented as a complex sequence of data 356. As shown in FIG. 3C, the complex sequence of data 356 includes the frequency band of interest 302, the interferers 304, and interference 306. The interference 306 represents bleed through or spill over of the interferers 304 onto the frequency band of interest 302 as a result of the I/Q imbalances between the in-phase sequence of data and the quadrature phase sequence of data for which the analog low pass filter or the digital filter alone, or in any combination thereof, cannot remove from a recovered sequence of data 358.

As a result, the ability of the communications receiver 106 to recover the recovered sequence of data 358 from the received communications signal 350 is degraded due to a misalignment in gain and/or phase between the phase and/or the gain between the in-phase sequence of data and the quadrature phase sequence of data. A magnitude of the misalignment of the phase and/or the gain between the in-phase sequence of data and the quadrature phase sequence of data determines a magnitude of the interferers 304. For example, a larger misalignment in-phase and/or in gain results in the magnitude of the interferers 304 being larger when compared to a smaller misalignment in-phase and/or in gain results.

The DSP 210 operates on the in-phase sequence of data 258a and the quadrature phase sequence of data 258b to compensate for the I/Q imbalances. In other words, the DSP 210 may adjust one or more sequence parameter values corresponding to one or more sequence parameters, such as gain and/or phase to provide some examples, to compensate for the I/Q imbalances such that the recovered sequence of data 358 more closely approximates the recovered sequence of data 354.

Digital Signal Processor (DSP)

FIG. 4A illustrates a block diagram of a digital signal processor (DSP) used in the communications receiver according to an exemplary embodiment of the present invention. Similar to the received communications signal 154, the sequence of data 258 may include an electromagnetic energy within the desired frequency band of interest and electromagnetic energy outside of the desired frequency band of interest. The electromagnetic energy located outside of the desired frequency band of interest represents one or more interferers embedded within the received communications signal 154. The one or more interferers may include one or more observational interferers, the one or more observational interferers including one or more images outside of the desired frequency band of interest. The DSP 210 may determine sequence parameter values from observing the one or more observational interferers and/or images of the one or more observational interferers embedded with the sequence of data 258 to adjust one or more sequence parameters, such as gain and/or phase to provide some examples, to compensate for the I/Q imbalances. As shown in FIG. 4A, the DSP 210 includes an I/Q compensation module 402, a combination module 404, a desired channel processing module 406, and an interferer processing module 408.

The I/Q compensation module 402 compensates for the I/Q imbalances between the in-phase sequence of data 258a and the quadrature phase sequence of data 258b to provide a compensated in-phase sequence of data 450a and a compensated quadrature phase sequence of data 450b. More specifically, the phase sequence of data 258a and the quadrature phase sequence of data 258b may be characterized by the sequence parameters. The I/Q compensation module 402 may adjust the sequence parameters based upon the sequence parameter values 454.1 through 454.n. In an exemplary embodiment, the I/Q compensation module 402 adjusts a gain of the sequence of data 258 and/or a phase relation between the sequence of data 258 to balance the in-phase sequence of data 258a and the quadrature phase sequence of data 258b in response to the sequence parameter values 454.1 through 454.n.

The combination module 404 combines the compensated in-phase sequence of data 450a and the compensated quadrature phase sequence of data 450b to provide an intermediate recovered sequence of data 452. The intermediate recovered sequence of data 452 includes the one or more observational interferers and/or the one or more images of the one or more observational interferers.

The desired channel processing module 406 processes the intermediate recovered sequence of data 452 to provide the recovered sequence of data 156. The desired channel processing module 406 may optionally include a channel select filter to filter a desired frequency band of interest represented by the desired frequency band of interest 302 from the intermediate recovered sequence of data 452. The desired channel processing module 406 may additionally decode the intermediate recovered sequence of data 452, demodulate the intermediate recovered sequence of data 452, or perform any other suitable signal processing that will be apparent those skilled in the relevant art(s) on the intermediate recovered sequence of data 452 to recover the recovered sequence of data 156.

The interferer processing module 408 provides the sequence parameter values 454.1 through 454.n relating to the sequence parameters to the I/Q compensation module 402. The interferer processing module 408 selects the sequence parameter values 454.1 through 454.n and communicates the sequence parameter values 454.1 through 454.n to the I/Q compensation module 402. In response, the I/Q compensation module 402 adjusts the sequence parameters based upon the sequence parameter values 454.1 through 454.n.

FIG. 4B graphically illustrates an operation of the digital signal processor (DSP) used in the communications receiver according to an exemplary embodiment of the present invention. An un-calibrated sequence of data 460 represents a sequence of data having an I/Q imbalance that has not been substantially reduced through calibration. The un-calibrated sequence of data 460 may include an electromagnetic energy within a desired frequency band of interest 412 and electromagnetic energy outside of the desired frequency band of interest 412. The electromagnetic energy located outside of the desired frequency band of interest 412 represents one or more interferers embedded within the received communications signal 154. The one or more interferers may include one or more non-observational interferers 414, the one or more non-observational interferers 414 including one or more images 416 within the desired frequency band of interest. The one or more interferers may additionally include one or more observational interferers 418, the one or more observational interferers 410 including one or more images 420 outside of the desired frequency band of interest.

The DSP observes the one or more observational interferers 418 and/or the one or more observational interferers 410 to determine one or more sequence parameter values. The one or more sequence parameter values are used to adjust one or more sequence parameters, such as gain and/or phase to provide some examples, to calibrate for the I/Q imbalance within the un-calibrated sequence of data 460 to provide a calibrated sequence of data 462.

The calibrated sequence of data 462 represents a sequence of data having an I/Q imbalance that has been substantially reduced through calibration. The calibrated sequence of data 462 may include the desired frequency band of interest 412, the one or more non-observational interferers 414, the one or more images 416 of the one or more non-observational interferers 414, the one or more observational interferers 418, and the one or more images 420 of the one or more observational interferers 418. However, the one or more images 416 of the one or more non-observational interferers 414, the one or more observational interferers 418, and the one or more images 420 of the one or more observational interferers 418 are substantially reduced in the calibrated sequence of data 462 as compared to the calibrated sequence of data 450 thereby improving the ability of the communications receiver 106 to recover the recovered sequence of data 156 from the received communications signal 154.

I/Q Compensation Module

FIG. 5 illustrates a block diagram of an I/Q compensation module used in the digital signal processor (DSP) according to an exemplary embodiment of the present invention. The I/Q compensation module 402 compensates for the I/Q imbalances to provide the compensated in-phase sequence of data 450a and the compensated quadrature phase sequence of data 450b. In this exemplary embodiment, the I/Q compensation module 402 may adjust a gain of the in-phase sequence of data 258a and a phase relation between the in-phase sequence of data 258a and the quadrature phase sequence of data 258b. However, this example is not limiting, those skilled in the relevant art(s) may implement that the I/Q compensation module 402 using any known gain and/or phase compensation techniques differently from the teachings herein without departing from the spirit and scope of the present invention.

As shown in FIG. 5, the I/Q compensation module 402 includes a gain scaling module 502, a phase scaling module 504, and a combination module 506. The gain scaling module 502 scales the in-phase sequence of data 258a to provide the compensated in-phase sequence of data 450a based upon the sequence parameter value 454.1. The gain scaling module 502 may increase, decrease, or leave substantially unchanged a magnitude of the in-phase sequence of data 258a in response to the sequence parameter value 454.1. Adjustment of the in-phase sequence of data 258a in this manner substantially aligns the magnitude of the in-phase sequence of data 258a with a magnitude of the quadrature phase sequence of data 258b.

Mathematically, it may be demonstrated that the I/Q imbalance leads to cross-talk between the in-phase sequence of data 258a and the quadrature phase sequence of data 258b, that is, the quadrature phase sequence of data 258b includes an additive component of the in-phase sequence of data 258a. This additive component of the in-phase sequence of data 258a embedded within the quadrature phase sequence of data 258b misaligns the phase relation between the in-phase sequence of data 258a and the quadrature phase sequence of data 258b. The phase scaling module 504 scales the in-phase sequence of data 258a to provide an additive component of the in-phase sequence of data 550 based upon sequence parameter value 454.2. The phase scaling module 504 may increase, decrease, or leave substantially unchanged the additive component of the in-phase sequence of data 550 in response to the sequence parameter value 454.2. The combination module 506 combines the additive component of the in-phase sequence of data 550 with the quadrature phase sequence of data 258b to provide the compensated quadrature phase sequence of data 450b. Adjustment of the phase in this manner substantially aligns the phase of the in-phase sequence of data 258a and the quadrature phase sequence of data 258b such that the in-phase sequence of data 258a and the quadrature phase sequence of data 258b are 90-degree offset in phase from one another.

Interferer Processing Module

FIG. 6 illustrates a block diagram of an interferer processing module used in the digital signal processor (DSP) according to an exemplary embodiment of the present invention. The interferer processing module 408 provides one or more sequence parameter values to allow for real-time adjustment of one or more sequence parameters, such as gain and/or phase to provide some examples, to compensate for the I/Q imbalances. The interferer processing module 408 includes a channel rejection filter 602, an interferer measurement module 604, and a sequence parameter generator module 606.

The channel rejection filter 602 may remove a desired frequency band of interest, such as the desired frequency band of interest 412 to provide an example, embedded within the intermediate recovered sequence of data 452, leaving at least one of the one or more observational interferers and the one or more images of the one or more observational interferers, such as the one or more observational interferers 418 and the one or more images 420 of the one or more observational interferers 418 to provide some examples, embedded within the intermediate recovered sequence of data 452 to provide an interferer 650. In an exemplary embodiment, the channel rejection filter 602 is optional. In this exemplary embodiment, the interferer measurement module 604 may directly receive the intermediate recovered sequence of data 452.

The interferer measurement module 604 provides a signal metric 652 based upon the interferer 650. The interferer measurement module 604 may measure a signal metric, such as a mean, a total energy, an average power, a mean square, an instantaneous power, a root mean square, a variance, a norm, and/or any other suitable signal metric that will be apparent to those skilled in the relevant art(s), of the interferer 650.

The sequence parameter generator module 606 provides the sequence parameter values 454.1 through 454.n corresponding to one or more sequence parameters based upon the signal metric 652. The sequence parameter generator module 606 is described in further detail below in FIG. 7.

The interferer processing module 408 may operate in one of a calibration mode of operation and an operational mode of operation. During the calibration mode of operation, the sequence parameter generator module 606 causes the I/Q compensation module 402 to iteratively adjust the sequence parameter values 454.1 through 454.n corresponding to the sequence parameters to minimize the I/Q imbalance.

FIG. 7 is a flowchart 700 of exemplary operational steps of the interferer processing module operating in a calibration mode of operation according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 7.

At step 702, a sequence parameter generator module, such as the sequence parameter generator module 606 to provide an example, selects a sequence parameter value from among one or more sequence parameter values. The sequence parameter values correspond to possible values of a sequence parameter from among one or more sequence parameters. The sequence parameters may include gain, phase, and/or any other suitable sequence parameter that may be used to compensate for I/Q imbalance that will be apparent to those skilled in the relevant art(s).

At step 704, the sequence parameter generator module adjusts the sequence parameter according to the sequence parameter value from step 702 with the goal to minimize the I/Q imbalance between an in-phase signal and quadrature phase signal of quadrature signal, such as the sequence of data 258 to provide an example. For example, an I/Q compensation module, such as the I/Q compensation module 402 to provide an example, may adjust a gain in accordance with a gain value from step 702.

At step 706, an interferer measurement module, such as the interferer measurement module 604 to provide an example, determines a signal metric of an interferer, such as the one or more observational interferers 418 or the one or more images 420 of the one or more observational interferers 418 to provide some examples, that is generated in response to the adjustment of the sequence parameter in step 704. The signal metric may include a mean, a total energy, an average power, a mean square, an instantaneous power, a root mean square, a variance, a norm, and/or any other suitable signal metric that will be apparent to those skilled in the relevant art(s) of the interferer. The interferer represents electromagnetic energy located outside of a desired frequency band of interest. The signal metric of the interferer is related to the I/Q imbalance. A larger signal metric indicates that the I/Q imbalance between the quadrature communication signal is larger when compared to a smaller signal metric. Accordingly, an iterative adjustment of the sequence parameter values for the sequence parameter may be used to reduce the signal metric of the interferer corresponding to a decrease in the I/Q imbalance.

At step 708, the sequence parameter generator module compares the signal metric from step 706 to a threshold signal metric. The threshold signal metric represents a previously measured signal metric corresponding to a previous sequence parameter value having a lowest signal metric indicating a minimal I/Q imbalance. The operational control proceeds to step 710 if the signal metric is less than or substantially equal to the threshold signal metric. In this situation, the I/Q imbalance is lesser when using the sequence parameter value from step 702 as compared to an threshold processing value corresponding to the threshold signal metric. The operational control proceeds to step 712 if the signal metric is greater than the threshold signal metric. In this situation, the I/Q imbalance is greater when using the sequence parameter value from step 702 as compared to the threshold processing value.

At step 710, the sequence parameter generator module updates the threshold signal metric to correspond to the signal metric from step 706 and/or the threshold processing value from step 708 to correspond to the sequence parameter value from step 702.

At step 712, the sequence parameter generator module determines whether more sequence parameter values for the sequence parameter are yet to be evaluated. More specifically, the sequence parameter generator module may evaluate each of the sequence parameter values for the sequence parameter or the operational control may implement any well known search algorithm such as a linear search, a binary search, an interpolation search, or any other suitable search that will be apparent to those skilled in the relevant art(s). Alternatively, the sequence parameter generator module may evaluate each of the sequence parameter values for the sequence parameter until the sequence parameter value from step 702 exceeds a target threshold. The operational control proceeds to step 714 to evaluate more sequence parameter values for the sequence parameter. Else, all sequence parameter values for the sequence parameter have been evaluated. The operational control proceeds to step 716.

At step 714, the sequence parameter generator module selects another sequence parameter value from among one or more sequence parameter values corresponding to the sequence parameter then reverts back to step 704 to adjust the sequence parameter. The operational control repeats steps 704 through 712 using the another sequence parameter value.

At step 716, the sequence parameter generator module selects another sequence parameter from among the sequence parameters. For example, if the sequence parameter generator module selects a first sequence parameter, such as gain to provide an example, the sequence parameter generator module may select a second sequence parameter, such as phase to provide an example, in step 716. The operational control repeats steps 702 through 714 using the second sequence parameter.

During the operational mode of operation, the interferer processing module 408 monitors the interferers 304 to ensure any remaining I/Q imbalance does not substantially degrade the ability of the communications receiver 106 to recover the recovered sequence of data 156 from the received communications signal 154.

FIG. 8 is a flowchart 800 of exemplary operational steps of the interferer processing module operating in an operational mode of operation according to an aspect of the present invention. The invention is not limited to this operational description. Rather, it will be apparent to persons skilled in the relevant art(s) from the teachings herein that other operational control flows are within the scope and spirit of the present invention. The following discussion describes the steps in FIG. 8.

At step 802, an interferer measurement module, such as the interferer measurement module 604 to provide an example, adjusts one or more sequence parameters according to one or more threshold processing values from the calibration mode of operation as described in FIG. 7. For example, an I/Q compensation module, such as the I/Q compensation module 402 to provide an example, may adjust a gain and/or phase in accordance with a gain value and/or phase value determined by the calibration operation.

At step 804, an interferer measurement module, such as the interferer measurement module 604 to provide an example, determines a signal metric of an interferer, such as the interferers 304 to provide an example, that is generated in response to the adjustment of the sequence parameter in step 802. The signal metric may include a mean, a total energy, an average power, a mean square, an instantaneous power, a root mean square, a variance, a norm, and/or any other suitable signal metric that will be apparent to those skilled in the relevant art(s) of the interferer. The interferer represents electromagnetic energy located outside of a desired frequency band of interest. The signal metric of the interferer is related to the I/Q imbalance. A larger signal metric indicates that the I/Q imbalance between the quadrature communication signal is larger when compared to a smaller signal metric.

At step 806, the interferer measurement module may compare the signal metric from step 804 to an threshold signal metric corresponding to one or more threshold processing values from step 802. Alternatively, the interferer measurement module may compare the signal metric from step 804 to an operational threshold. The operational threshold is proportional to the threshold signal metric. The operational control reverts to step 808 if the signal metric from step 804 is less than or substantially equal to the threshold signal metric. Else, the operational control proceeds to step 808 to monitor the signal metric.

At step 808, the operational control reverts back to the calibration mode of operation as described in FIG. 7 to determine the threshold processing values. Operational conditions, such as temperature to provide an example, may cause the threshold processing values of step 802 to no longer adequately compensate for the I/Q imbalance. As a result, new processing values need to be determined for the threshold processing values of step 802.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A digital signal processor (DSP) configured to compensate for an in-phase/quadrature phase (I/Q) imbalance between an in-phase sequence of data and a quadrature phase sequence of data in a communications receiver, the in-phase sequence of data and the quadrature phase sequence of data being characterized by one or more sequence parameters, comprising:

an I/Q compensation module configured to compensate for the I/Q imbalance by adjusting the one or more sequence parameters in response to one or more sequence parameter values to provide a compensated in-phase sequence of data and a compensated quadrature phase sequence of data;

a combination module configured to combine the compensated in-phase sequence of data and the compensated quadrature phase sequence of data to provide an intermediate recovered sequence of data; and an interferer processing module configured to determine one or more signal metrics of one or more images from the intermediate recovered sequence of data, and to provide the one or more sequence parameter values based upon the one or more signal metrics, wherein the I/Q compensation module is further configured to scale the in-phase sequence of data based upon the one or more sequence parameter values to provide an additive component of the in-phase sequence of data, and to combine the additive component and the quadrature phase sequence of data the compensated quadrature phase sequence of data.

2. The DSP of claim 1, wherein the one or more sequence parameters comprise:
a gain of the in-phase sequence of data;
a phase of the in-phase sequence of data;
a gain of the quadrature phase sequence of data; or
a phase of the quadrature phase sequence of data.

3. The DSP of claim 2, wherein the I/Q compensation module is further configured to compensate for the I/Q imbalance by adjusting the one or more sequence parameters comprising:
the gain of the in-phase sequence of data;
the phase of the in-phase sequence of data;
the gain of the quadrature phase sequence of data; or
the phase of the quadrature phase sequence of data.

4. The DSP of claim 1, wherein the I/Q compensation module comprises:
a first scaling module configured to adjust a first sequence parameter from among the one or more sequence parameters based upon a first sequence parameter value to provide the compensated in-phase sequence of data; and
a second scaling module configured to adjust a second sequence parameter from among the one or more sequence parameters based upon a second sequence parameter value.

5. The DSP of claim 1, wherein the I/Q compensation module comprises:
a scaling module configured to scale the in-phase sequence of data based upon a sequence parameter value from among the one or more sequence parameter values to provide the additive component of the in-phase sequence of data; and
a second combination module configured to combine the additive component of the in-phase sequence of data and the quadrature phase sequence of data to provide the compensated quadrature phase sequence of data.

6. The DSP of claim 1, wherein the one or more signal metrics comprise:
a mean of the one or more images;
a total energy of the one or more images;
an average power of the one or more images;
a mean square of the one or more images;
an instantaneous power of the one or more images;
a root mean square of the one or more images;
a variance of the one or more images; or
a norm of the one or more images.

7. The DSP of claim 1, wherein the interferer processing module is further configured to compare the one or more signal metrics to one or more threshold signal metrics, the one or more threshold signal metrics being one or more previously measured signal metrics corresponding to one or more previous sequence parameter values having one or more substantially lowest signal metrics.

8. The DSP of claim 7, wherein the interferer processing module is further configured to update the one or more threshold signal metrics to the one or more signal metrics if the one or more signal metrics are less than or substantially equal to the one or more threshold signal metrics.

9. The DSP of claim 7, wherein the interferer processing module is further configured provide the one or more sequence parameter values corresponding to the one or more threshold signal metrics as the one or more sequence parameter values.

10. A method to compensate for an in-phase/quadrature phase (I/Q) imbalance between an in-phase sequence of data and a quadrature phase sequence of data in a communications receiver, the in-phase sequence of data and the quadrature phase sequence being characterized by one or more sequence parameters, comprising:
adjusting the one or more sequence parameters using a possible parameter value from among one or more sequence parameter values corresponding to a first sequence parameter from among the one or more sequence parameters;
determining a signal metric of an interferer, the interferer being provided in response to the adjustment of the one or more sequence parameters;
comparing the signal metric to a threshold signal metric, the threshold signal metric being a previously measured signal metric corresponding to a previous sequence parameter value having a lowest signal metric;
updating the threshold signal metric to the signal metric if the signal metric is less than or substantially equal to the threshold signal metric;
repeating the adjusting through the updating until the one or more sequence parameter values corresponding to the first sequence parameter have been evaluated; and
adjusting the one or more sequence parameters using the one or more sequence parameter values corresponding to the threshold signal metric to compensate for the I/Q imbalance.

11. The method of claim 10, wherein the sequence parameters comprise:
a gain of the in-phase sequence of data;
a phase of the in-phase sequence of data;
a gain of the quadrature phase sequence of data; or
a phase of the quadrature phase sequence of data.

12. The method of claim 11, wherein the adjusting the one or more sequence parameters comprises:
adjusting a parameter, the parameter comprising:
the gain of the in-phase sequence of data;
the phase of the in-phase sequence of data;
the gain of the quadrature phase sequence of data; or
the phase of the quadrature phase sequence of data.

13. The method of claim 10, wherein the determining the signal metric of the interferer comprises:
determining the signal metric of the interferer, wherein the signal metric comprises:
a mean of an image of the interferer;
a total energy of the image of the interferer;
an average power of the image of the interferer;
a mean square of the image of the interferer;
an instantaneous power of the image of the interferer;
a root mean square of the image of the interferer;
a variance of the image of the interferer; or
a norm of the image of the interferer.

14. The method of claim 10, wherein the determining the signal metric of the interferer comprises:
determining the signal metric of the interferer, the interferer representing energy located outside of a desired frequency band of interest.

15. The method of claim 10, further comprising:
selecting a second sequence parameter from among the sequence parameters; and
repeating the adjusting through the updating until the one or more sequence parameter values corresponding to the second sequence parameter have been evaluated.

16. The method of claim 10, further comprising:
  selecting a first possible parameter value from among the sequence parameter values corresponding to the first sequence parameter, and wherein the repeating the adjusting through the updating comprises:
  repeating the adjusting through the updating and the selecting until the sequence parameter values corresponding to the first sequence parameter have been evaluated.

17. An apparatus for providing one or more sequence parameter values for compensating for an in-phase/quadrature phase (I/Q) imbalance between an in-phase component and a quadrature phase component of a sequence of data in a communications receiver, comprising:
  an interferer measurement module configured to determine one or more signal metrics of one or more images from the sequence of data, and
  a sequence parameter generator module configured to provide the one or more sequence parameter values based upon the one or more signal metrics,
  wherein the interferer measurement module is further configured to compare the one or more signal metrics to one or more threshold signal metrics, the one or more threshold signal metrics being one or more previously measured signal metrics corresponding to one or more previous sequence parameter values having one or more substantially lowest signal metrics.

18. The apparatus of claim 17, wherein the in-phase sequence of data and the quadrature phase sequence of data are characterized by one or more sequence parameters, and further comprising:
  an I/Q compensation module configured to compensate for the I/Q imbalance by adjusting the one or more sequence parameters in response to the one or more sequence parameter values.

19. The apparatus of claim 17, further comprising:
  a combination module configured to combine the in-phase component and the quadrature phase component to provide a recovered sequence of data,
  wherein the interferer measurement module is further configured to determine the one or more signal metrics of one or more images from the recovered sequence of data.

20. The DSP of claim 1, wherein the interferer processing module is further configured to operate in a calibration mode of operation and an operational mode of operation, wherein the calibration mode of operation includes the I/Q compensation module iteratively adjusting the sequence parameter values corresponding to the sequence parameters to reduce I/Q imbalance, and wherein the operational mode of operation includes the interferer processing module monitoring the one or more images to reduce degradation of the recovered sequence of data.

21. The DSP of claim 1, further comprising:
  a channel processing module configured to process a desired frequency band of interest from the intermediate recovered sequence of data to provide a recovered sequence of data.

22. The apparatus of claim 17, further comprising:
  an I/Q compensation module configured to provide the compensated in-phase sequence of data and the compensated quadrature phase sequence of data by adjusting one or more sequence parameters in response to the one or more sequence parameter values.

* * * * *

UNITED STATES PATENT AND TRADEMARK OFFICE
CERTIFICATE OF CORRECTION

PATENT NO. : 8,416,895 B2
APPLICATION NO. : 12/535484
DATED : April 9, 2013
INVENTOR(S) : Jensen et al.

Page 1 of 1

It is certified that error appears in the above-identified patent and that said Letters Patent is hereby corrected as shown below:

In the Claims

Column 15, Line 6, please replace "data the" with --data to provide the--.

Column 15, Line 67, please replace "provide" with --to provide--.

Column 16, Lines 7-8, please replace "quadrature phase sequence" with --quadrature phase sequence of data--.

Column 17, Lines 21 and 22, please replace "threshold," with --threshold--.

Signed and Sealed this
Thirtieth Day of July, 2013

Teresa Stanek Rea
*Acting Director of the United States Patent and Trademark Office*